(12) United States Patent
Fouchard

(10) Patent No.: US 12,739,233 B2
(45) Date of Patent: Sep. 15, 2026

(54) PORTABLE AUTONOMOUS DEVICE FOR SECURING DATA TRANSFER AND CORRESPONDING METHOD

(71) Applicant: Eric Fouchard, Bruz (FR)

(72) Inventor: Eric Fouchard, Bruz (FR)

( * ) Notice: Subject to any disclaimer, the term of this patent is extended or adjusted under 35 U.S.C. 154(b) by 0 days.

(21) Appl. No.: 18/827,013

(22) Filed: Sep. 6, 2024

(65) Prior Publication Data

US 2025/0063024 A1 Feb. 20, 2025

Related U.S. Application Data

(63) Continuation of application No. PCT/EP2023/055948, filed on Mar. 8, 2023.

(30) Foreign Application Priority Data

Mar. 8, 2022 (FR) ....................................... 2202025

(51) Int. Cl.
*H04L 9/40* (2022.01)
*G06V 30/40* (2022.01)

(52) U.S. Cl.
CPC .......... *H04L 63/0428* (2013.01); *G06V 30/40* (2022.01); *H04L 63/0272* (2013.01); *H04L 63/0861* (2013.01); *H04L 63/0876* (2013.01)

(58) Field of Classification Search
CPC ............. H04L 63/0428; H04L 63/0272; H04L 63/0861; H04L 63/0876; G06V 30/40
See application file for complete search history.

(56) References Cited

U.S. PATENT DOCUMENTS

2014/0244514 A1* 8/2014 Rodriguez ........... G06Q 20/227 348/150
2018/0260617 A1 9/2018 Jones et al.
2021/0117524 A1 4/2021 McKell-Redwood et al.

FOREIGN PATENT DOCUMENTS

EP 3288214 A1 2/2018
WO 2020221938 A1 11/2020

OTHER PUBLICATIONS

International Search Report and Written Opinion dated Jun. 1, 2023 for corresponding International Application No. PCT/EP2023/055948, filed Mar. 8, 2023.
English translation of the International Search Report and Written Opinion dated Jun. 9, 2023 for corresponding International Application No. PCT/EP2023/055948, filed Mar. 8, 2023.

* cited by examiner

*Primary Examiner* — Jeffrey C Pwu
*Assistant Examiner* — Mayasa A. Shaawat
(74) *Attorney, Agent, or Firm* — David D. Brush; Westman, Champlin & Koehler, P.A.

(57) ABSTRACT

A portable autonomous device for securing data transfer. The device is configured to perform an encrypted communication with at least one terminal such as a telephone, a tablet, a portable computer or a dedicated terminal and includes: a plurality of sensors including at least one camera, a sensor delivering at least one item of biometric information and a chip-card reader; and a data processor for processing data delivered by the sensors to deliver pre-processed authentication data to the terminal, not requiring, in the terminal, a driver dedicated to each sensor.

10 Claims, 4 Drawing Sheets

PORTABLE AUTONOMOUS DEVICE FOR SECURING DATA TRANSFER AND CORRESPONDING METHOD

CROSS-REFERENCE TO RELATED APPLICATION

This application is a continuation application of International Application No. PCT/EP2023/055948, filed Mar. 8, 2023, and published as WO 2023/170186 A1, on Sep. 14, 2023, not in English, which claims priority to French Patent Application No. FR2202025, filed Mar. 8, 2022, the contents of which are incorporated herein by reference in their entireties.

1. FIELD OF THE INVENTION

The field of the invention is that of authenticating an individual and securing data transfer between items of electronic equipment, in particular for mobile applications. In particular, the invention relates to secure access to data or services, using a standard or undifferentiated terminal, for example of the smartphone, tablet or portable computer type.

2. PRIOR ART

The use is known, associated with terminals such as smartphones, tablets or portable computers, of sensors for authenticating an individual, to secure a data exchange or to check the identity or presence of this individual. These sensors, for example biometric sensors or cameras, define as many interfaces as the terminal must check. For this purpose, the suppliers of interfaces must develop drivers adapted to each type and each make of terminal, and adapt them, and sometimes completely rejig them, each time the software system of each terminal is updated. In practice, it is therefore not possible to have available all types of interface on all types of terminal. For example, biometric interfaces or chip-card readers can be developed to operate with a computer under Windows (registered trade mark), but will not be usable with an Apple (registered trade mark) telephone.

Furthermore, increasing the number of drivers introduces risks of faults, or even of security failures.

This is of course not limited solely to the management of interfaces. The same applies to secure applications, i.e. those requiring a high level of security and/or access to private, confidential and secure data (bank data, medical data, personnel data, etc.), for example to issue a certificate of authentication, which may combine the identity of an individual, biometric validation thereof and the taking account of a third-party certificate of a secure application. Making available and maintaining these elements on all available terminals cannot be envisaged in practice. Furthermore, intrinsically, guaranteeing security of the various terminals available may be subject to surety, and security failures, known or unknown, are numerous.

For this reason, in applications where high security is required, it is generally necessary to use dedicated products, involving extra costs and an increase in the number of items of equipment necessary.

For example, for an application intended for a police department, which must read an identity card or a driving license, and link to its owner via biometry means, having recourse to one or more remote databases, it is generally necessary to use dedicated and expensive terminals, whereas each police officer also holds a telephone that is not used.

The situation is similar for numerous other secure applications (access to specific services, for example banking, or more generally requiring authentication of an individual).

3. SUMMARY

There is therefore a need for a simple and effective solution, universal or almost universal, not requiring specific secure applications and/or a specific driver for each sensor and for each terminal, and which is also more secure.

There is also a need for simple and effective ergonomics, furthermore making it possible to limit the overall size and the number of appliances that have to be used, while ensuring optimised securing of authentication.

For this purpose in particular, the invention proposes a portable autonomous device for securing data transfer, comprising:

- means for encrypted communication with at least one terminal such as a telephone, a tablet, a portable computer or a dedicated terminal;
- a plurality of sensors including at least one camera, a sensor delivering at least one item of biometric information and a chip-card reader;
- means for processing data delivered by said sensors, able to deliver pre-processed authentication data to said terminal, not requiring, in said terminal, a driver dedicated to each sensor.

Thus the invention proposes a portable device, independent of the terminal, that can be of very small size, that ensures all the use of the sensors, independently of the type of terminal, and implementing secure communication, via encryption in particular, with the terminal.

Thus the terminal can access secure services without having to use and/or control one or more of said sensors, or interfaces. The terminal of the invention provides a function of interface servers: it is not necessary for the terminal to comprise specific applications for controlling the interfaces, but on the contrary can have available various interfaces, incorporated and managed by the security device of the invention.

According to a particular aspect, said encrypted communication means can take into account at least one identifier of said terminal, previously stored in a secure memory.

It may for example be a case of an IMEI identifier recorded on SDMS/OTA. According to another particular aspect, the device of the invention comprises, in a memory, a computer program for controlling said sensors and implementing dedicated applications, transmitting to the terminal only data intended to be displayed on a screen.

According to another particular aspect, the device of the invention does not transmit any sensitive data to the terminal.

Sensitive data means for example biometric data and/or data directly resulting from reading a chip card. The device according to the invention, in this example, transmits to the terminal only data of the type confirming an authentication, or confirming the validity of a chip card, without transmitting to the terminal the data (biometric or resulting from reading a chip card) that served as a basis for such validity.

Thus the terminal, for example a mobile telephone, is used only as a man-machine interface, avoiding any risk as to the security of the data being processed, even if this telephone is corrupted. The terminal moreover has no need to be equipped with applications dedicated to the processing of these sensitive data. The invention thus makes it possible to dispense with the development and periodic updating of applications for a plurality of terminals.

According to another particular aspect, said means for encrypted communication can create a VPN with said terminal, using a unique temporary code.

This unique code can for example be displayed on the screen of said terminal and be read with the camera of said portable autonomous device for securing the transfer of data.

According to a particular aspect, said processing means comprise:

- means for analysing at least one image of a face and/or of an iris, delivered by said camera;
- means for analysing at least one image of an official document, such as a passport or identity card, delivered by said camera;
- means for analysing at least one biometric fingerprint delivered by said biometric sensor;
- means for analysing identification data read on a chip card by said chip-card reader.

In a particular embodiment, the camera can also be used for reading fingerprints.

For example, in a particular embodiment, the device of the invention can comprise, in a casing without a man-machine interface such as a keypad or a screen:

- a camera, at least one sensor delivering at least one item of biometric information and a chip-card reader;
- means for secure connection to a remote authentication server, supplying identification-check information;
- internal means for processing:
  - at least one official document read by means of said camera and/or said chip-card reader;
  - at least one item of biometric information delivered by said sensor or sensors; and
  - at least one item of check information supplied by said remote authentication sensor,
- so as to produce positive or negative authentication data according to said at least one official document, said at least one item of biometric information and said identification-check data;
- means for communication with at least one terminal such as a telephone, a tablet, a portable computer or a dedicated terminal;
- a server enabling said terminal to access, via said communication means, said authentication information, by means of a secure application, so that said terminal fulfils man-machine interface functions delivering said authentication information, without accessing said official documents or said remote authentication server.

The portable autonomous device can also comprise means for secure connection to a remote server, according to said pre-processed authentication data.

Thus the device provides two independent secure connections, one with the terminal and the other with the remote server.

In this case, said processing means can comprise means for confirming to said terminal the authentication of said individual, taking account of the pre-processed authentication data and of data delivered by said remote server.

In a particular embodiment, the device comprises means for creating a secure audio and/or video communication between said terminal and at least one other remote terminal.

In another particular embodiment, the security device comprises means for supplying an authentication certificate combining:

- an identity, obtained by reading at least one official document, by means of said camera and/or said chip-card reader;
- a biometric validation of this identity, obtained by means of said camera or a fingerprint reader, and
- a certificate previously recorded in a memory of said security device by a corresponding authority.

It is of course possible to combine these various embodiments.

The invention also relates to a method for securing data transfers, using at least one portable autonomous device for securing the transfer of data as described above and comprising, in said device, the following steps:

- establishing an encrypted communication with at least one terminal such as a telephone, a tablet, a portable computer or a dedicated terminal;
- obtaining signals delivered by at least one of the sensors belonging to the group comprising a camera, a sensor delivering at least one item of biometric information and a chip-card reader;
- processing data delivered by said sensors, delivering pre-processed authentication data to said terminal, not requiring, in said terminal, a driver dedicated to each sensor.

In an example embodiment, adapted to collecting and processing data identifying an individual, using a device as described above, the method can comprise in particular the following steps, implemented by said portable device:

- processing at least one document read by means of said camera and at least one item of biometric information delivered by said sensor or sensors, so as to produce authentication data according to said at least one official document and said at least one item of biometric information;
- using at least one off-line web service, enabling a terminal, such as a telephone, a tablet, a portable computer or a dedicated terminal, to access said authentication information via communication means, by means of a secure web application.

4. DESCRIPTION OF THE FIGURES

Other features and advantages of the invention will emerge more clearly from the reading of the following description of a particular embodiment, given by way of simple illustrative and non-limitative example, and the accompanying drawings, among which:

Figure 4:
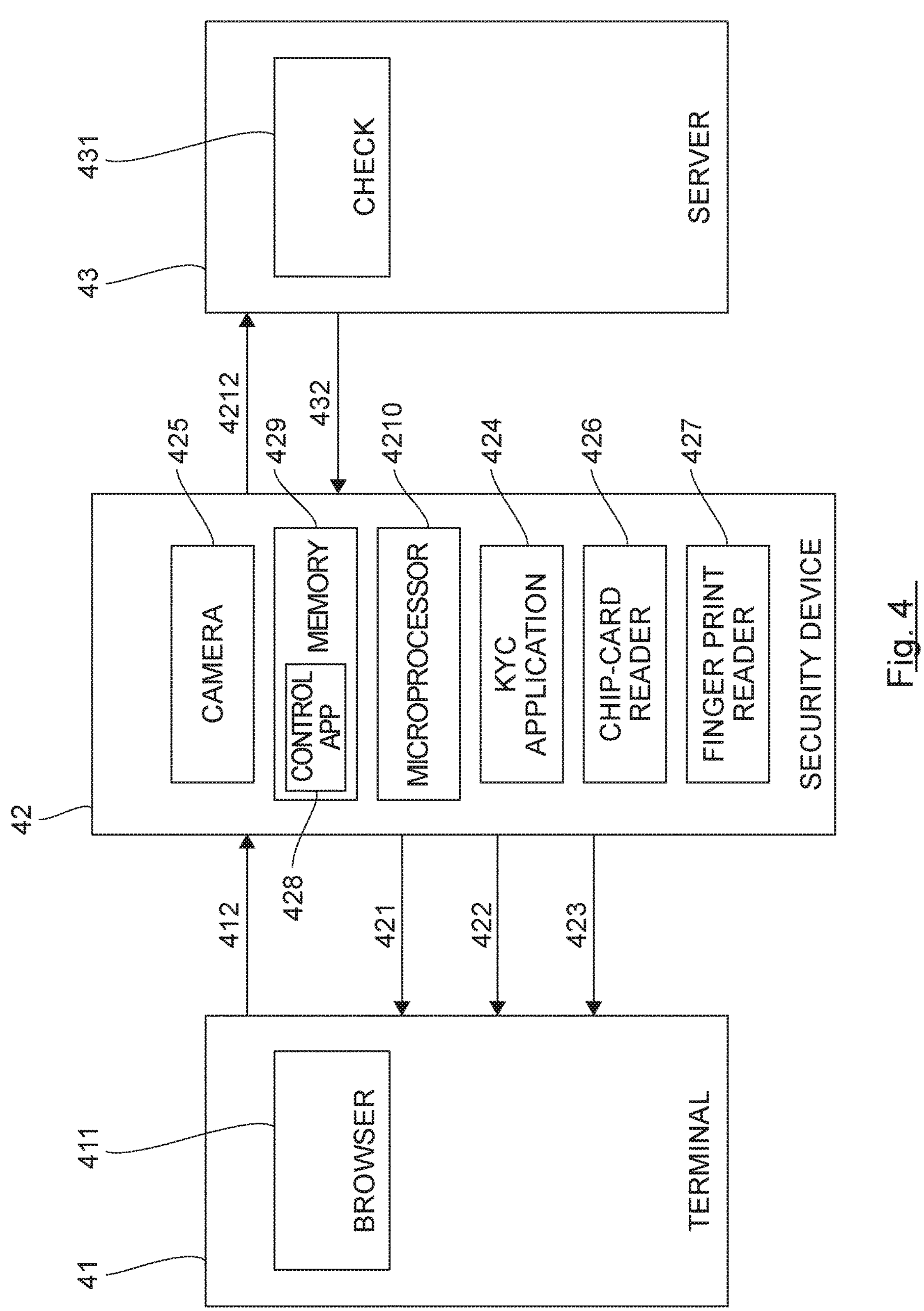
Figure 5:
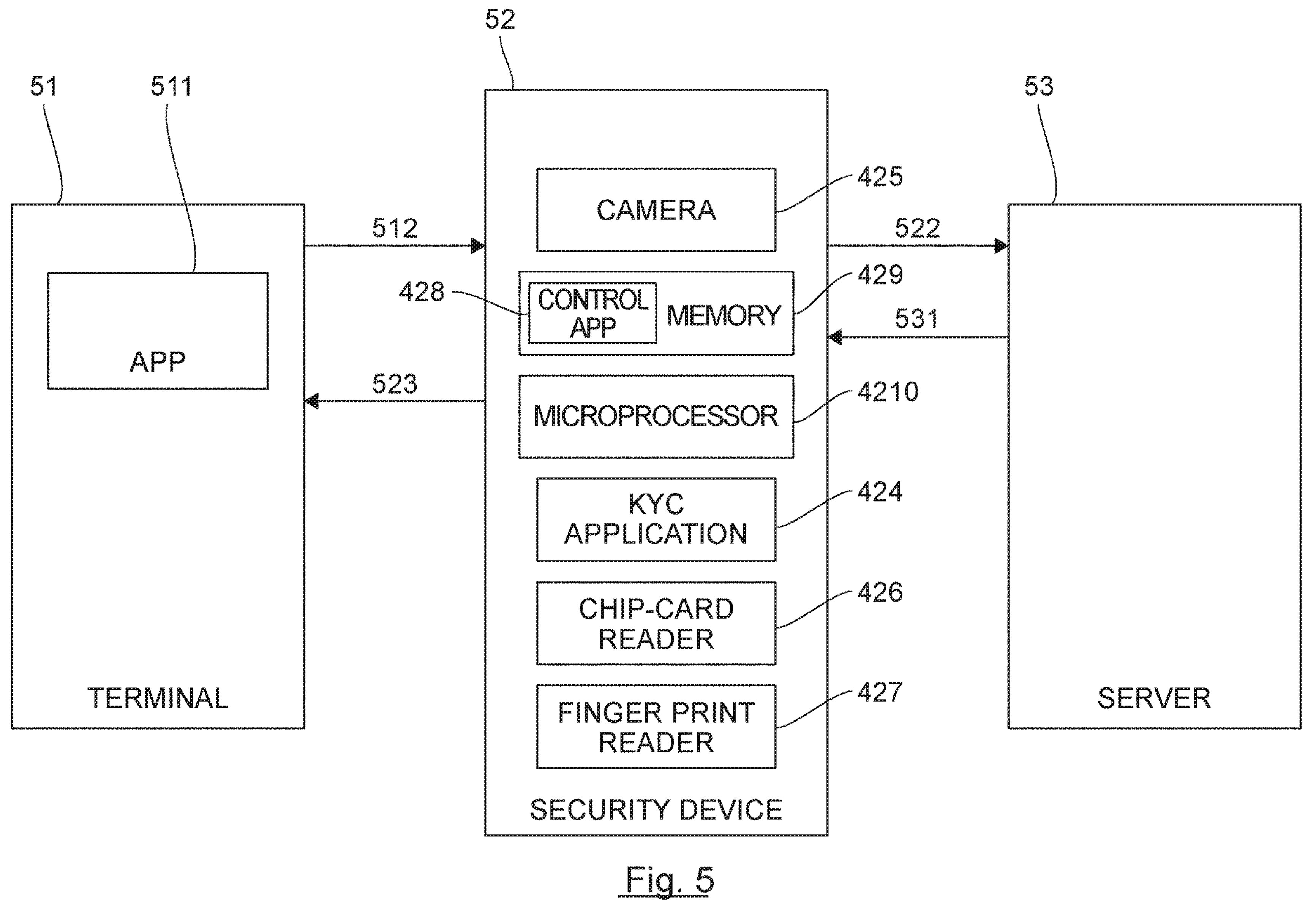

FIG. 4 presents a first example of use of the device of the invention for recognising an individual ("KYC" or "know your customer");

FIG. 5 presents a second example of use of the device of the invention for recognising an individual.

5. DESCRIPTION OF AN EMBODIMENT

Figures 1A, 1B, 1C:
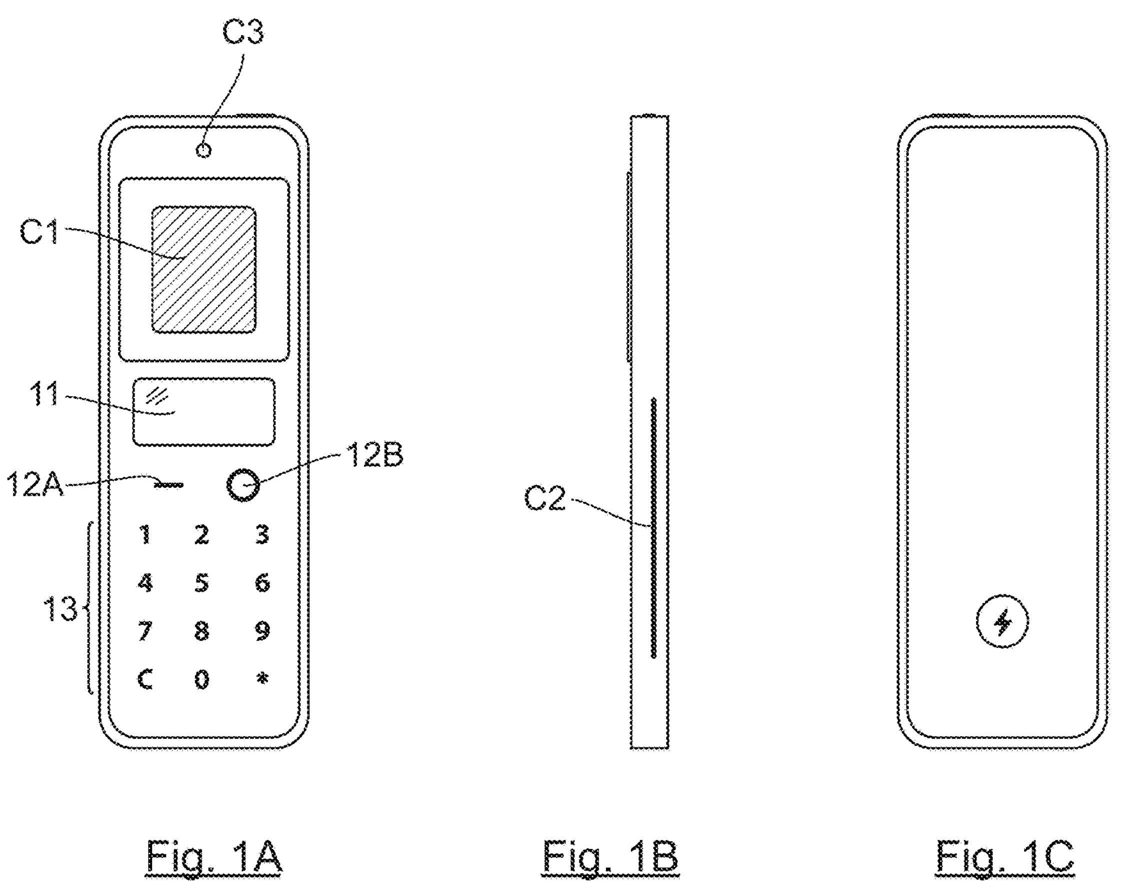
FIGS. 1A to 1C illustrate an example of a security device according to the invention, respectively from the front, from the side and from behind.

An example of a security device according to the invention is illustrated on FIGS. 1A to 1C. This device of small size, for example 140×42×16 mm, is easily transportable, for example in a pocket or a wallet, and has a low weight, for example of the order of 180 g.

It has a series of sensors C, comprising at least:

a fingerprint reader C1, for example of the FAP30 type;

a chip-card reader C2, for example to the ID1-7816 format;

a camera, here a double camera C3 (infrared and standard), mounted tiltably so as to be able to be used on one side or other of the device and adapted to at least recognise a face, an iris and an MRZ ("machine readable zone") strip present on an identity card or other official document.

It furthermore comprises a battery, for example 3000 mAh, Li-polymer, supplying the various components, including a microprocessor, for example of the octa-core type operating at 2 GHz.

It is equipped with several means for connection with the terminal and with a distinct server, for example in accordance with the Wi-Fi®, Bluetooth®, 4G and/or 5G standards, and where applicable NFC.

It comprises several connectors, in particular USB type C, Micro SD, PSAM.

It does of course have software protection means, including a firewall. It is also designed so as to be hardware protected, for example in accordance with IP67. It has a small man-machine interface, comprising for example an e-ink screen 11, two function buttons 12A, 12 B and a 12-key keypad 13. Such a screen in particular reduces power consumption. A standard screen, and/or simple light-emitting diodes, can also be used.

A mirror can also be provided to facilitate centring of the face with respect to the camera.

A sliding or hinged flap can protect the camera, the fingerprint sensor and the buttons when the device is not being used.

A clip can be provided on the back of the device, to be able to hold the device for example in a pocket.

These various features are of course indicative and can be adapted, supplemented or replaced according to requirements.

Using the device of the invention makes it possible to use the MMI interface of a terminal in the context of an authentication and/or a secure connection, without this terminal having to manage the various peripherals, and in particular the sensors for authenticating and reading documents. This is because these operations are provided by the device itself, which is highly secure, and in particular does not allow access to its data from the terminal. Use of this security device therefore begins with a secure connection between the terminal and the device.

Figure 2:
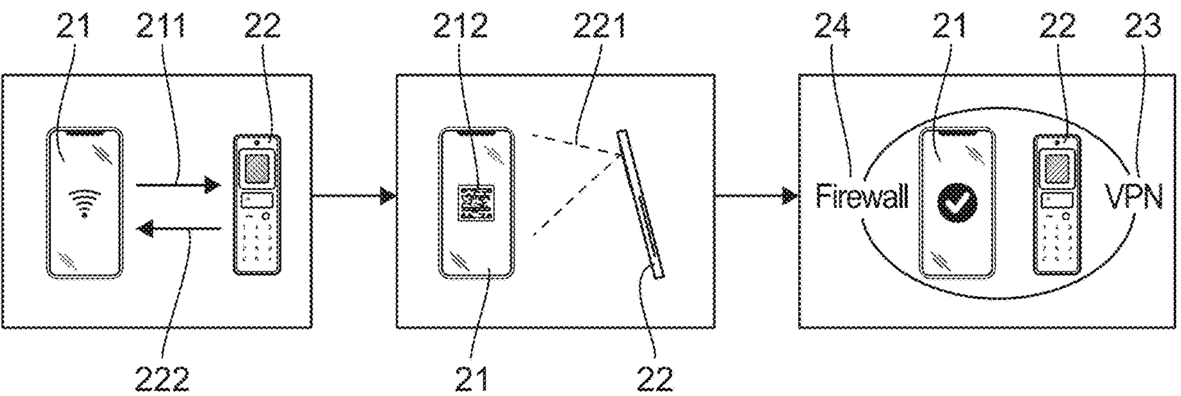
FIG. 2 illustrates schematically the steps of creating a VPN between the security device of FIG. 1 and a terminal, such as a telephone.

According to one approach illustrated by FIG. 2, the terminal 21 sends a request 211, for example in Wi-Fi, to the security device 22. The terminal 21 presents a pseudorandom code, for example in the form of a QR code 212, by means of pseudorandom data 222 transmitted by the device 22, which the camera of the security device reads (221). On the basis of this code, a secure encrypted communication, in the form of a VPN 23, with firewall 24, is made between the terminal 21 and the security device 22.

Thus it is not necessary to secure the terminal 21 itself, which is used only as an offset screen of the security device 22, displaying a window of a web browser, not requiring a dedicated application.

The security device 22 fulfils all the security functions. It knows the terminal 21 to which it must connect to implement each session, of a predetermined limited duration and with a single-use key. This identification is done for example by means of an identifier of the terminal, previously recorded on SDMS/OTA, for example the IMEI identifier of the terminal.

Other approaches for making a secure connection can be used. In particular, in a simplified version, pairing via Bluetooth® can be implemented, for example by means of a static QR code on the back of the security device, led by the terminal. In this case however, the terminal must have an application for the checking operations, and use the security device in "slave" mode, calling the functions of the latter by SDK.

Figure 3B:
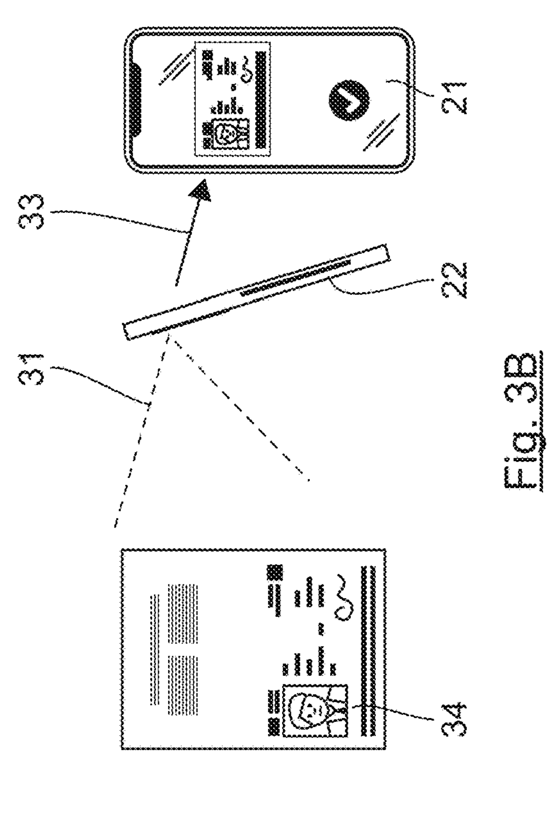
FIGS. 3A to 3D illustrate four examples of use of the sensors of the security device of FIG. 1, respectively for recognising the iris or face, reading an official paper document, for reading a chip card or reading a fingerprint.
Figure 3D:
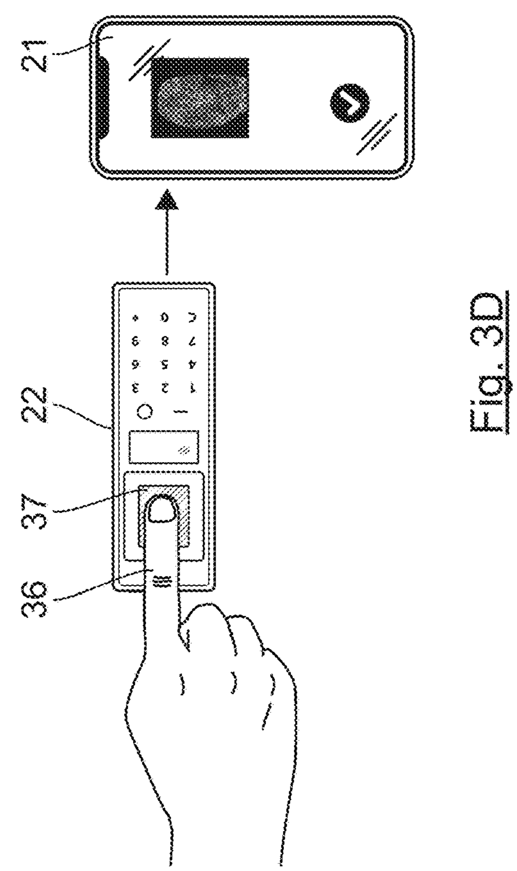
Figure 3A:
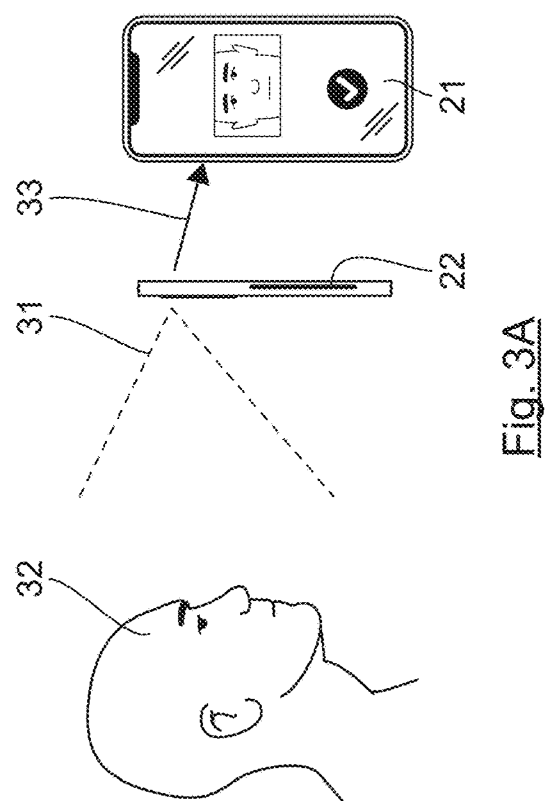
Figure 3C:
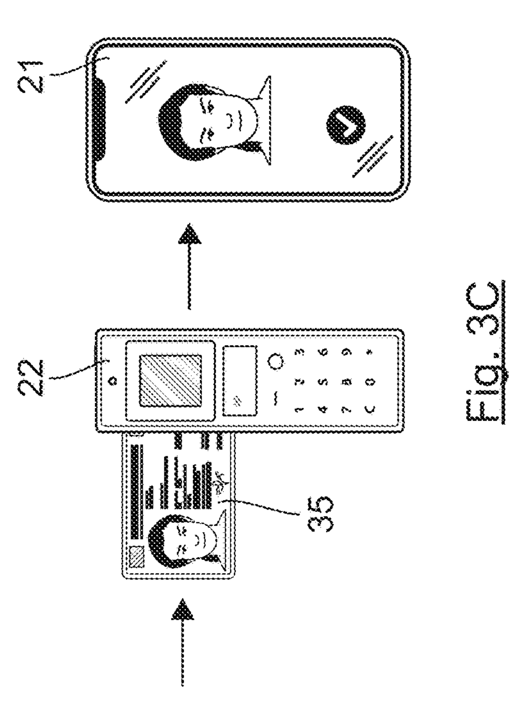

Once this connection between the terminal and the security device has been made, the security device can be used for numerous applications, for example:

FIG. 3A: facial and/or iris recognition: one or more shots 31 of the face 32 are made by the security device 22, which next provides the data processing (coding and extraction of useful data) and the exchange of control with a remote database. The result supplied according to the return of the database, as well as where applicable a view of the information obtained (face and information on the individual), is transmitted (33) to the terminal 21. Thus the sensitive data are processed solely by the security device, and not the terminal, which receives only validation or non-validation information;

FIG. 3B: the same approach can be implemented to read an official document, such as a passport 34, by means of the camera. Once again, the security device extracts therefrom, by adapted recognition and processing, the data useful for the check, and returns to the terminal only validation or non-validation information;

FIG. 3C: reading an official document in the form of a chip card 35 is also possible, by means of the chip-card reader. The validation is done in the same way;

FIG. 3D: recognition of the fingerprint of a finger 36 is also possible, using the fingerprint reader 37.

Reinforced security can be implemented by combining several of these approaches.

The security device therefore incorporates a set of sensors or physical interfaces useful for the checks, and the secure specific programs enabling use thereof. Thus it is not necessary to equip the various types of terminal with such interfacing and security programs, which would have to be developed and updated regularly, according to the products.

The same applies for the secure applications embedded in the device, for example for supplying an authentication certificate to the terminal, without the terminal being involved in obtaining and checking this certificate.

In an example embodiment, the security device never transmits "sensitive" information to the terminal. Sensitive information means information the security of which is critical, such as biometric fingerprints or data resulting from reading a chip card such as an identity document. The security device, in this case, transmits to the terminal only data confirming identity or validity of a chip card.

In this way a device is available that is universal, and what is more secure, access to the data and programs thereof being made difficult, if not impossible, because of the closed dedicated character of this device. Only one version of the programs installed in the device is necessary, and consequently easy to update as needed. This is in particular the case in the first approach described, where the terminal fulfils solely a screen interface and touch function, on a secure Wi-Fi connection, in a web browser: no interfacing or security software is installed on the terminal (only an application of the web type is used, for controlling the initial and final exchanges), which is therefore completely interchangeable.

FIG. 4 illustrates schematically an example embodiment, in the context of an identity check.

This FIG. 4 shows schematically the terminal 41, the security device 42 of the invention and a server 43, for example a governmental server enabling checks on individuals by an authorised person, for example a police officer, in particular via their identity document.

The terminal 41 is "empty", i.e. it contains no element related to the security of the secure processing that will be established, for example an identity check. Only its standard web browser 411 will be used, after a secure connection, for example in Wi-Fi, will have been established (as described in relation to FIG. 2).

For this, and as described in more detail in the patent document WO 2020/221938, the terminal 41 sends a connection request 412, and the security device 42 returns to it a unique QR code 421, generated randomly. The terminal 41 displays the QR code via the browser 411, which the user reads (422) by means of the camera 425 of the security device 42. This allows the creation of a secure temporary connection, of the VPN type, between the terminal 41 and the device 42 (FIG. 2C). The device 42 of course knows an identification of the terminal 41, previously recorded in a memory 4213 (for example on SDMS/OTA by the IMEI). It is then said device that provides all the sensitive operations (manipulating and/or accessing sensitive data). The terminal 41 fulfils solely, via its browser 411, a man-machine interface function, in particular by allowing a display of the useful data 423 delivered by the device 42 on its screen (making it possible in particular for the device 42 itself to be of small size, inexpensive and economical in power). It is therefore this security device 42 that implements the operations, and in particular, in the embodiment illustrated, an identification of an individual, by means of a dedicated "KYC" 424 application. As illustrated on FIGS. 3A to 3D, it uses its various sensors and interfaces to read the identity documents (via the camera 425 or the chip-card reader 426) and biometric information (via the camera 425 or the fingerprint reader 427).

These operations are controlled by an internal application 428, stored in a memory 429 implemented on a microprocessor 4210. This application 428 establishes a secure connection, in particular encrypted, for example by means of a post-quantum encryption in accordance with the recommendations of the ANSSI, or any other adapted means, with the server 43, example in 4G or 5G. This connection is independent of the terminal 41, and security is thus optimised.

If needed (supplementing its own screens and buttons), the device 42 uses the MMI of the terminal 41 (423).

The device 42 transmits to the server 43 the identity and biometric data collected 4212, after having processed, shaped and encrypted them in the required manner, and the server 43 returns the result 432 of the check 431 that it has made. The security device 42 transmits to the terminal 41 the information 423 to be displayed accordingly (result of the identification, as well as where applicable useful information (in particular identity) on the individual, coming from the official documents).

Thus, according to this embodiment of the invention, it is the device 42 that implements all the sensitive operations.

According to a second approach illustrated on FIG. 1, simplified as far as use of the security device 52 is concerned, but requiring a specific application 511 in the terminal 51, provision can be made for the device 42 to be used essentially to use the interfaces and sensors, for example to read the identity documents (via the camera 425 or the chip-card reader 426) and biometric information (via the camera 425 or the fingerprint reader 427) and to establish a secure connection with the remote server 53.

In this case, the identification application 511 (KYC) is installed and used in the terminal 51, which connects to the security device 52 (which then operates in "slave" mode), for example by reading a static QR code present on the back of this device, or displayed on its screen. The device 42 knows an identification of the terminal 41, previously recorded (for example on SDMS/OTA by the IMEI).

The terminal 51 next sends an identity check request 512 to the security device 52. The latter, as in the previous embodiment, establishes a secure connection with the server 53 and then transmits to it the collected data 522 and receives in response the result 531 of the identification. The security device 52 returns (523) this result to the terminal 51, as well as where applicable useful information (in particular identity) on the individual, coming from the official documents.

The security device thus behaves as an interface server for the terminal, and incorporates server software making available to the terminal its interfaces by means of a relatively simple SDK ("Software Development Kit"). It thus makes it possible to have available an application of the KYC type in particular at reduced cost.

In the two approaches, a "Secure Device Management System" is used in the security device, in order to control an OTA ("Over the Air") installation of the applications and rights.

It will be understood that this simplified second approach is less expensive to implement, but also less secure. The first approach makes it possible to take into account the fact that the terminal is presumed to be corruptible and must not be used for aspects relating to security, but only as an MMI screen, in the form of a browser window of the web type, not requiring any specific application. Only the data displayed on the screen are potentially exposed, but none of the confidential protected data processed internally by the device 42.

This first approach therefore appears preferable for numerous secure applications, such as identity check, biometric check, electronic signature, cryptotelephony, etc.

The pairing, for example in Wi-Fi, between the terminal and the security device is a session of limited duration using a single-use key.

Thus, apart from the application described previously of an identity check, the invention can for example be used for providing an authentication certificate combining identity, biometric validation and a third-party certificate of a secure application on the mobile.

An example of application of this procedure is the regulation of cryptocurrency in combating money laundering/corruption. In particular, in a context of national regulation, provision can be made for the requirement for a certificate of the "signature" type for each transaction. A cryptocurrency application, to be active in the country concerned, will have to "sign" the transactions to authenticate the users. This is easy by means of the security device of the invention: an authority (bank, office, etc.) is responsible for "signing" the applications, which is done by reading, with the security device, the identity and the biometric proof, and then transmitting them to a State server. This proof will then be compiled with in particular a timestamp, an identifier (ID), an identity document number and the original signature of the cryptocurrency application, in the form of an encrypted certificate retransmitted by NFC (for example) to the terminal of the user.

This key thus becomes the signature key of the transactions.

A similar process can be used "online", the certificate then being sent to the server of the cryptocurrency application, which will sign the client application on the terminal.

This process can also be transposed into other applications, for example to "sign" a check for access to a vehicle, or an access to sensitive equipment locked with this key.

A few possible examples of implementation of the invention are stated below:

1) police check: on a dedicated terminal, for example a mobile telephone of an officer, an application to read a driving license and/or an identity document on a chip card associated with a biometric check is implemented. The officer works on his terminal and, when the software asks him to read a chip card or a fingerprint or to take a shot of an iris or of the face, he switches on the security device, which returns to the terminal the check information supplied by a remote identity server and/or the public content of the card being red;
2) KYC or direct ("door-to-door") bank transfer applications, vertical application on the mobile and secure function;
3) payment terminal application associated with the immediate identity check. Apart from "mobile" in-store payment, applications in the home banking field, for example for opening credits or delivering banking effects at home;
4) use as terminal for entering identities for taking account of bets or similar;
5) electronic money compensation and transaction (cryptocurrencies, e-bank) regarding a user, etc;
6) identity self-check for personnel uses, such as:
    - shareholder or policy votes with strong biometric identity check and secure connection: remote voting on an easy-to-transport tool: the security device. In a particular embodiment, the latter can be an autonomous voting station for elections;
    - special access control by NFC (or other) after activation of a key (on checking an identity card or a passport or biometric information), opening a safe or door, triggering a process, for example home automation, etc.
7) strong electronic signature of official documents or bank transfers: distribution of PKI signature after strong identification.

More generally, the invention finds an effective and inexpensive application in all point-to-point secure processes requiring strong identification of a bearer, or individual.

These various applications can be installed on the terminal or, more effectively, on the security device so that the terminal provides only a view of the data on its screen, transmitted by the security device by Wi-Fi. All these applications are then on a secure device that does not have recourse to any telephone resource directly, limiting the risks with regard to a compromised telephone.

The security device of the invention is thus universal in its compatibility with clients: it can for example be used in the morning in relation to a Windows® computer, later on an iPhone® for action of a vendor while travelling, and finally on an Android® tablet of another vendor at the end of the day. The user is no longer confined to one operating system or to one screen size.

Although the present disclosure has been described with reference to one or more examples, workers skilled in the art will recognize that changes may be made in form and detail without departing from the scope of the disclosure and/or the appended claims.

The invention claimed is:

1. A portable autonomous device, wherein the device comprises:

at least one processor; and at least one non-transitory computer readable medium storing a computer program, which when executed by the at least one processor configures the portable autonomous device to secure transfer of authentication data of an individual to at least one terminal by:

encrypting a communication with the least one terminal;

controlling a plurality of sensors including at least one camera, each sensor delivering at least one item of biometric information, and a chip-card reader able to read an official document;

processing data delivered by the sensors to deliver pre-processed authentication data to said the at least one terminal, the processing comprising:

analyzing at least one image of a face and/or iris, delivered by the at least one camera, and extracting first data useful for a check;

analyzing at least one biometric fingerprint delivered by the at least one biometric sensor, and extracting second data useful for a check;

analyzing identification data read from a smart card representing an official document by the smart card reader;

checking the identification data with the first and second data and providing a result of identification of the individual, and issuing to the at least one terminal the result of identification of the individual, so that no driver dedicated to each sensor for processing raw data is required in the at least one terminal and no sensitive data delivered by the sensors is transmitted to the at least one terminal.

2. The portable autonomous device for securing data transfer according to claim 1, wherein the encrypting takes into account at least one identifier of the terminal, previously stored in a secure memory.

3. The portable autonomous device for securing data transfer according to claim 1, wherein the computer program configures the portable autonomous device to transmit to the terminal only data intended to be displayed on a screen.

4. The portable autonomous device for securing data transfer according to either claim 1, wherein the computer program configures the portable autonomous device to create an encrypted communication with the terminal, using a unique temporary code.

5. The portable autonomous device for securing data transfer according to claim 4, wherein the unique code is displayed on a screen of the terminal and the computer program configures the portable autonomous device to read with the camera the unique code displayed on the screen.

6. The portable autonomous device for securing data transfer according to claim 1, wherein the computer program configures the portable autonomous device to implement a secure connection to a remote server, using the pre-processed authentication data.

7. The portable autonomous device for securing data transfer according to claim 1, wherein the computer program configures the portable autonomous device to create a secure audio and/or video communication between the terminal and at least one other remote terminal.

8. The portable autonomous device for securing data transfer according to claim 1, wherein the computer program configures the portable autonomous device to supply an authentication certificate combining:

an identity, obtained by reading at least one official document, by using the camera and/or the chip-card reader;

a biometric validation of this identity, obtained by using the camera or a fingerprint reader, and a certificate previously recorded in a memory of the portable autonomous device by a corresponding authority.

9. A method implemented by at least one portable autonomous device comprising at least one processor executing a computer program recorded on at least one non-transitory computer readable medium, the method comprising:

securing transfer of authentication data of an individual to at least one terminal, wherein the securing comprises:

establishing an encrypted communication with the at least one terminal;

obtaining signals delivered by a plurality of sensors including at least a camera, a sensor delivering at least one item of biometric information and a chip-card reader able to read an official document;

processing data delivered by the sensors, delivering pre-processed authentication data to the terminal, the processing comprising:

analyzing at least one image of a face and/or iris, delivered by the at least one camera, and extracting first data useful for a check;

analyzing at least one biometric fingerprint delivered by the at least one biometric sensor, and extracting second data useful for a check;

analyzing identification data read from a smart card representing an official document by the smart card reader;

checking the identification data with the first and second data useful for a check and providing a result of identification of the individual, and issuing to the at least one terminal the result of identification of the individual, so that no driver dedicated to each sensor for processing raw data is required in the at least one terminal and no sensitive data is transmitted to the at least one terminal.

10. A portable autonomous device comprising:

at least one processor; and at least one non-transitory computer readable medium storing a computer program, which when executed by the at least one processor configures the portable autonomous device to secure transfer of authentication data of an individual to at least one terminal by:

encrypting a communication with at least one terminal;

controlling a plurality of sensors including at least one camera, each sensor delivering at least one item of biometric information, and a chip-card reader able to read an official document;

processing data delivered by the sensors to deliver preprocessed authentication data to the at least one terminal, the processing comprising:

analyzing at least one image of a face and/or iris, delivered by the at least one camera;

analyzing at least one biometric fingerprint delivered by the at least one biometric sensor;

analyzing at least one image of an official document and/or analyzing identification data read from a smart card representing an official document by the smart card reader;

implementing a secure connection to a remote server based on the preprocessed authentication data so as to obtain from the server a result of verification of the preprocessed authentication data; and issuing to the at least one terminal a result of verification of the preprocessed authentication data, so that no driver dedicated to each sensor for processing raw data is required in the at least one terminal.

* * * * *